US005379374A

United States Patent [19]

Ishizaki et al.

[11] Patent Number: 5,379,374

[45] Date of Patent: Jan. 3, 1995

[54] COLLABORATIVE INFORMATION PROCESSING SYSTEM AND WORKSTATION

[75] Inventors: Takeshi Ishizaki, Kawasaki; Yoshiyuki Nakayama, Yokohama; Kenjiro Mori, Machida; Fumio Nakamura, Kawasaki; Tadashi Yamamitsu, Hadano, all of Japan

[73] Assignee: Hitachi, Ltd., Tokyo, Japan

[21] Appl. No.: 795,828

[22] Filed: Nov. 21, 1991

[30] Foreign Application Priority Data

Nov. 21, 1990 [JP] Japan .................................. 2-313986

[51] Int. Cl.[6] ......................... G06F 3/14; G06F 15/16

[52] U.S. Cl. .................................... 395/155; 395/153; 395/157; 395/200; 395/700

[58] Field of Search ............... 395/155, 157, 153, 161, 395/162, 200, 700

[56] References Cited

U.S. PATENT DOCUMENTS

| | | | |
|---|---|---|---|
| 4,558,413 | 12/1985 | Schmidt et al. | 395/700 X |
| 4,809,170 | 2/1989 | Leblang et al. | 395/700 |
| 4,974,173 | 11/1990 | Stefik et al. | 395/153 |
| 5,008,853 | 4/1991 | Bly et al. | 395/153 |
| 5,129,056 | 7/1992 | Eagen et al. | 395/161 |
| 5,201,033 | 4/1993 | Eagen et al. | 395/155 |
| 5,206,934 | 4/1993 | Naef, III | 395/200 |
| 5,208,912 | 5/1993 | Nakayama et al. | 395/200 |
| 5,280,583 | 1/1994 | Nakayama et al. | 395/200 |
| 5,313,581 | 5/1994 | Giokas et al. | 395/200 |
| 5,319,747 | 6/1994 | Gerrissen et al. | 395/155 |

OTHER PUBLICATIONS

"Multimedia Environment for Remote Multiple Attendee Interactive Decision-Making: MERMAID", 40th National Convention, TPS, pp. 1371-1372.

*Primary Examiner*—Raymond J. Bayerl
*Attorney, Agent, or Firm*—Antonelli, Terry, Stout & Kraus

[57] ABSTRACT

In a collaborative information processing system including a plurality of terminals each having a multiwindow function and each being connected to the other terminal via a network, each terminal includes a plurality of application programs for issuing a request for an input event and a request for a window, a window server for converting input data received from the input device into a logical input event and for updating an image on a display screen depending on the content of an output request received from the application program, a plurality of window library modules connected to the window server via a logical communication path and linked with the application programs, and a control program for communicating an input event with other terminals via the network. Each window library module linked with an application program in a collaborative operation mode transfers an input event received from the window server to the control program and delivers an input event received from the control program to the application program to which it is linked therewith.

6 Claims, 12 Drawing Sheets

COLLABORATIVE INFORMATION PROCESSING SYSTEM AND WORKSTATION

CROSS-REFERENCE TO RELATED APPLICATIONS

This application relates to U.S. application Ser. No. 07/350,850 filed on May 12, 1989 entitled "Joint Information Processing System Including Plural Terminals"; U.S. application Ser. No. 07/614,087 filed on Nov. 15, 1990 entitled "Joint Information Processing System Comprising a Plurality of Terminal Apparatuses Guaranteeing Identicalness of Data Processing Apparatuses Guaranteeing Identicalness of Data Processing Results"; U.S. application Ser. No. 07/743,851 filed on Aug. 13, 1991 entitled "Method and System for Storing and Retrieving Collaboratively Processed Information" assigned to the present assignee, the contents of which are incorporated herein by reference.

BACKGROUND OF THE INVENTION

The present invention relates to a collaborative information processing system in which a plurality of terminal users in an identical building or facility or at remote locations conduct an electronic conversation or a collaborative information processing while referencing an identical screen image through data communications, and in particular, to a program control method for implementing an electronic conversation.

Heretofore, meeting have been held through telephone and facsimile communications. Moreover, there has been an increasing need in recent years a system in which group work is accomplished in a realtime fashion based on electronically processed information by use of remotely located workstations communicating via high-speed communication networks. An example of such a system has been reported in "Multimedia Environment for Remote Multiple Attendee Interactive Decision-making: MERMAID" presented in the 40-th National Convention IPS, Japan.

In the conventional system of the type mentioned above, an application program (a client program) to be applied to an electronic conversation, or a collaborative information processing is required to be unique to the system. In such a system, various types of programs already accumulated cannot be utilized for collaborative information processing. Consequently, it is necessary for the program developing section to additionally prepare programs for this particular type of system. Moreover, the user is disadvantageously required to learn how to operate programs unique to such a system.

SUMMARY OF THE INVENTION

It is therefore an object of the present invention to eliminate the aforementioned problems in the conventional system so that a program generated without taking the electronic conversation and the group work into consideration can be applied to the group work basically without any modification thereof.

Another object of the present invention is to provide a collaborative information processing system and a workstation in which a user operating a workstation having a multi-window system of a server/ client model can conduct group work on electronically processed information in cooperation with other workstations, while accessing the electronically processed information from the workstations in a realtime fashion.

In order to achieve the object stated above in accordance with one aspect of the present invention, there is provided a workstation for performing a collaborative information processing in cooperation with at least one other workstations connected via a network comprising:

input means for inputting data;

display means having a display screen for presetting thereon a plurality windows;

execution means for executing programs and modules;

memory means for storing programs and modules to be executed by said execution means; and communication means for performing communication with said one of the other workstations via said network, said memory means storing:

a conversation control program for communicating with another conversation control program in said one of the other workstations via said communication means to control the collaborative information processing;

a plurality of client programs each for performing an information processing in accordance with an input event supplied thereto and for generating an output request in accordance with a result of the information processing;

a plurality of window library modules provided respectively in association with said client programs; and a window server program for converting input data inputted from said input means to either one of said windows into a logical input event, for supplying the logical input event to one of said plurality of window library modules, which window library module is associated with said one window, and for updating a display content presented on the display screen in accordance with an output request generated from one of said client programs and received via one of said window library modules, wherein at least one of said plural window library modules is coupled with said conversation control program such that the window library module supplies a logical input event received from said window server to said conversation control program, delivers a logical input event received from said conversation control program to said one of client programs associated with the window library module, and passes an output request from said one client program to said window server program, and wherein said conversation control program operates to transmit input events received from said one library module to said another conversation control program via said communication means.

In accordance with another feature of the present invention, in order for the respective terminals to achieve group work in cooperation with other terminals, it is only necessary to modify the standard window library supported by the general window system. That is, of the modules constituting the standard window library supported by the general window system, those required to be cooperative with the conversation control program are modified as follows. Namely, for each of the modules, without altering a function name to be adopted when the module is called by the client program, a function necessary for the group work need only be added thereto, thereby producing a new library for an objective collaborative information processing.

In more detail, in the window library thus created in accordance with the present invention, a module to get events or event acquire module, called by the client program is executed to receive an event from the window server to transfer the event to the conversation control program. The conversation control program accomplishes a processing necessary for the group work on the received event, for example, an event report to another station. On the other hand, the conversation control program is then executed to send the event together with an event received from another station to the event acquire module. Namely, the event acquire module is executed to deliver the event received from the conversation control program to the client program linked therewith.

If the client program linked with the event acquire module is running in a local mode (other than the group work mode), the event acquire module is executed to send the event received from the window server directly to the client program.

According to these features of the present invention, each application or client program can call any module of the modified window library with the same function name as used before the modification. In consequence, the existing programs accumulated before the installation of the collaborative system mentioned above can be applied to an electronic conversation environment and/or the group work environment without any restrictions. In order to use an existing client program in an electronic conversation program, it is only necessary to simply link an object program obtained by compiling a source program of the client program with the library thus generated for the electronic conversation.

The foregoing and other objects, advantages, manner of operation and features of the present invention will be understood from the following detailed description when read in conjunction with the accompanying drawings.

DESCRIPTION OF THE PREFERRED EMBODIMENTS

Figure 1:
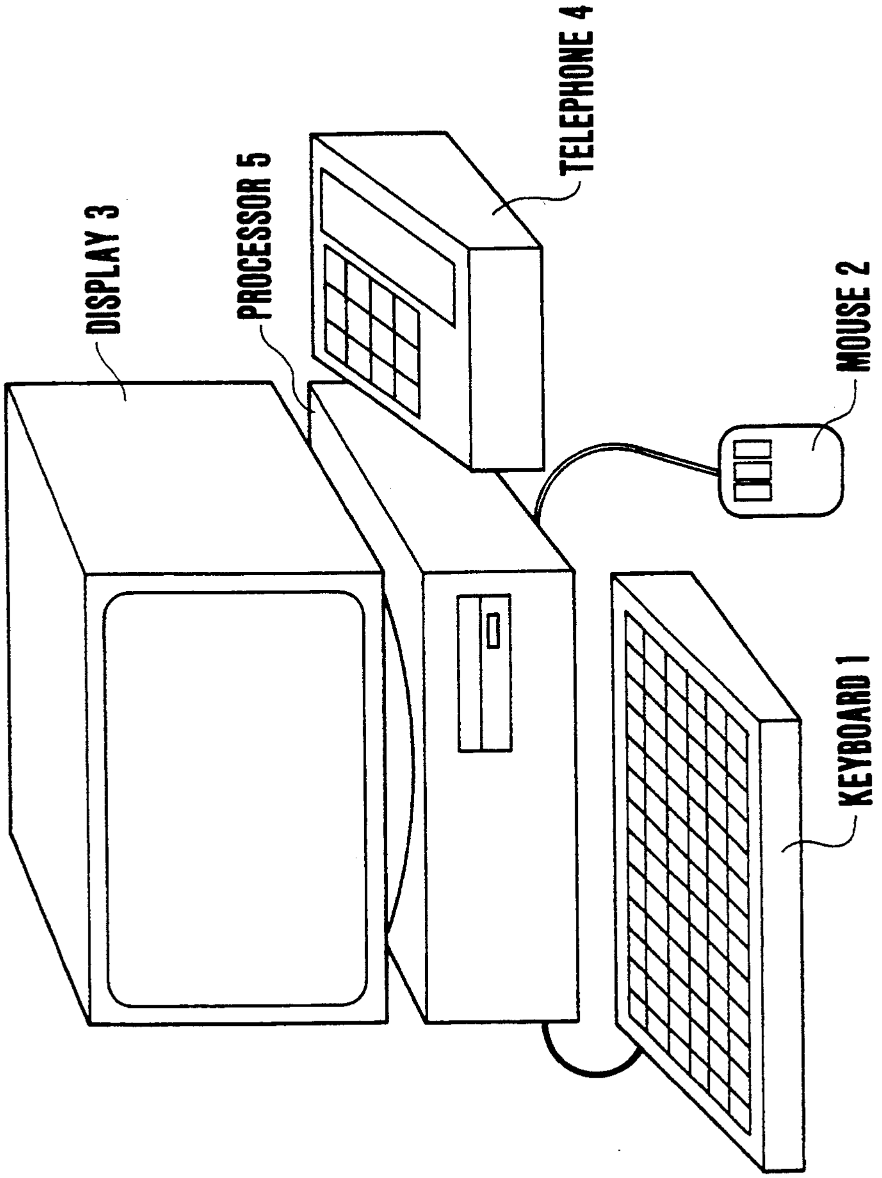
FIG. 1 is a perspective view showing the overall appearance of a workstation for use with an electronic conversation system in an embodiment according to the present invention.

Referring now to the drawings, a description will be made of an electronic conversation system in a collaborative information processing system according to an embodiment of the present invention.

In the electronic conversation system of the present embodiment, there are adopted, for example, as shown in FIG. 1, an input device 1, such as a keyboard for the user to input characters and data, a pointing device 2, such as a mouse and/or a tablet, an output device 3, such as a display for presenting thereon processing results, and a workstation 5 provided with a telephone set 4 for accomplishing communications via speech or audio signals.

The telephone set 4 may be of an ordinary type or may be integrally provided to be connected to the workstation via an appropriate interface. When the telephone set 4 is integrated with the workstation 5, in addition to communication using ordinary speech, there can be achieved a transmission of synthesized speech, an accumulation of received speech in a storage, and the like.

The electronic conversation system according to the embodiment of the present invention includes a plurality of workstations. These workstations are connected to each other via a communication path or channel to communicate data therebetween. The communication path may be established by a local area network (LAN) and/or a public ISDN network. When the electronic conversation system is to be used in a private building or facility, the LAN is preferably adopted; whereas, when the system is operated between remote locations, the ISDN preferably will be employed.

Figure 2:
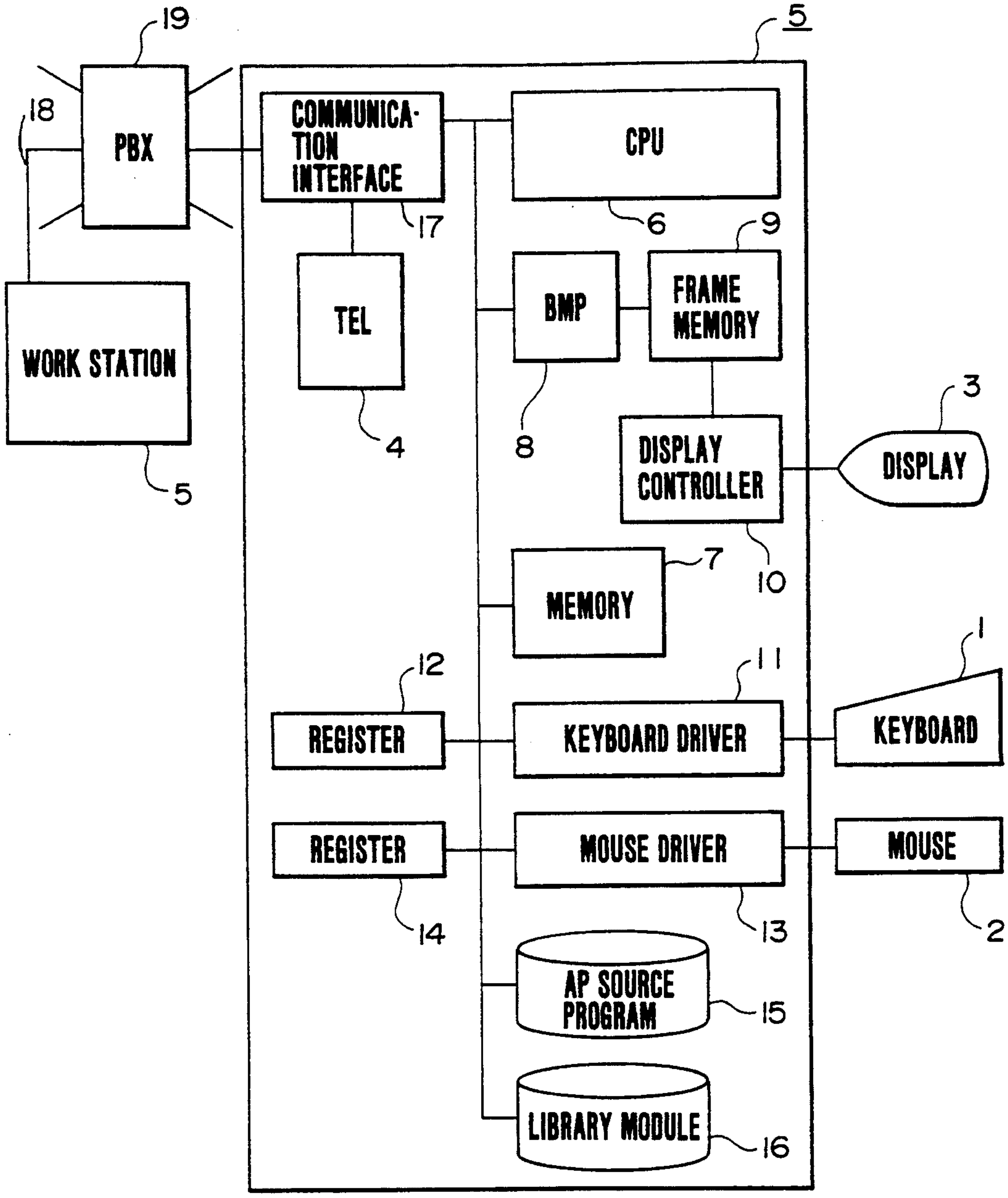
FIG. 2 is a block diagram schematically showing the system configuration of the workstation.

FIG. 2 shows the internal constitution of the workstation 5. A central processing unit (CPU) 6 reads a program from a memory or storage 7 to execute the program. A result of the processing thus executed is further processed by a bit map processor (BMP) 8 and is then stored in a frame memory 9. A display controller 10 reads screen data stored in the frame memory 9 to present the screen data on the display 3.

An input from the keyboard 1 is decoded by a keyboard driver 11 to be stored in a register 12. Similarly, an input from the mouse 2 is decoded by a mouse driver 13 and is then loaded in a register 14. An auxiliary storage, such as a hard disk is loaded with a source file 15 of client programs, a window library module 16, and the like. The workstation 5 is coupled via a communication interface 17 to a communication path 18 so as to be linked via a private branch exchange (PBX) 19 to another workstation.

Figure 3:
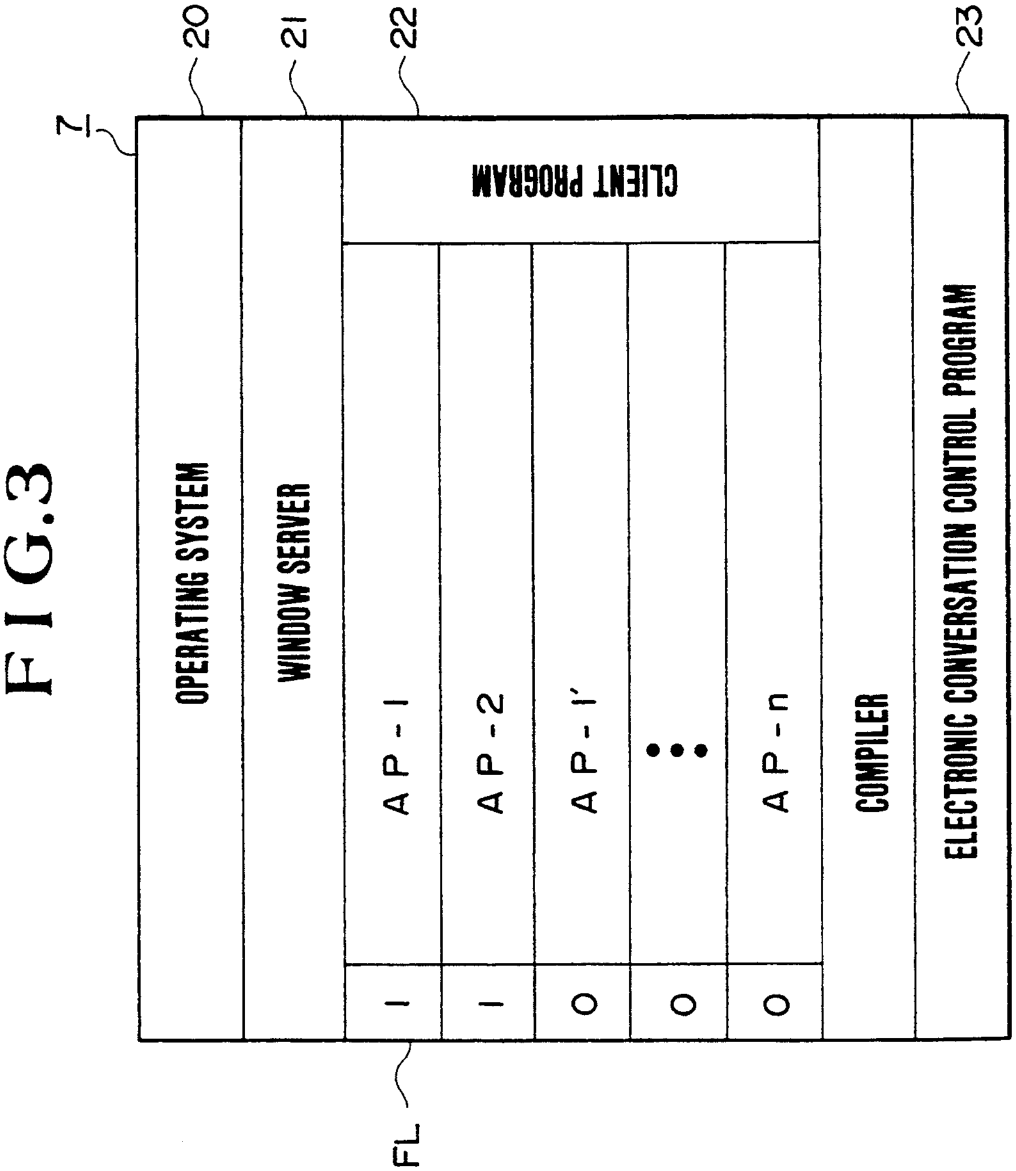
FIG. 3 is a diagram for explaining programs stored in a memory of each workstation.
Figure 4:
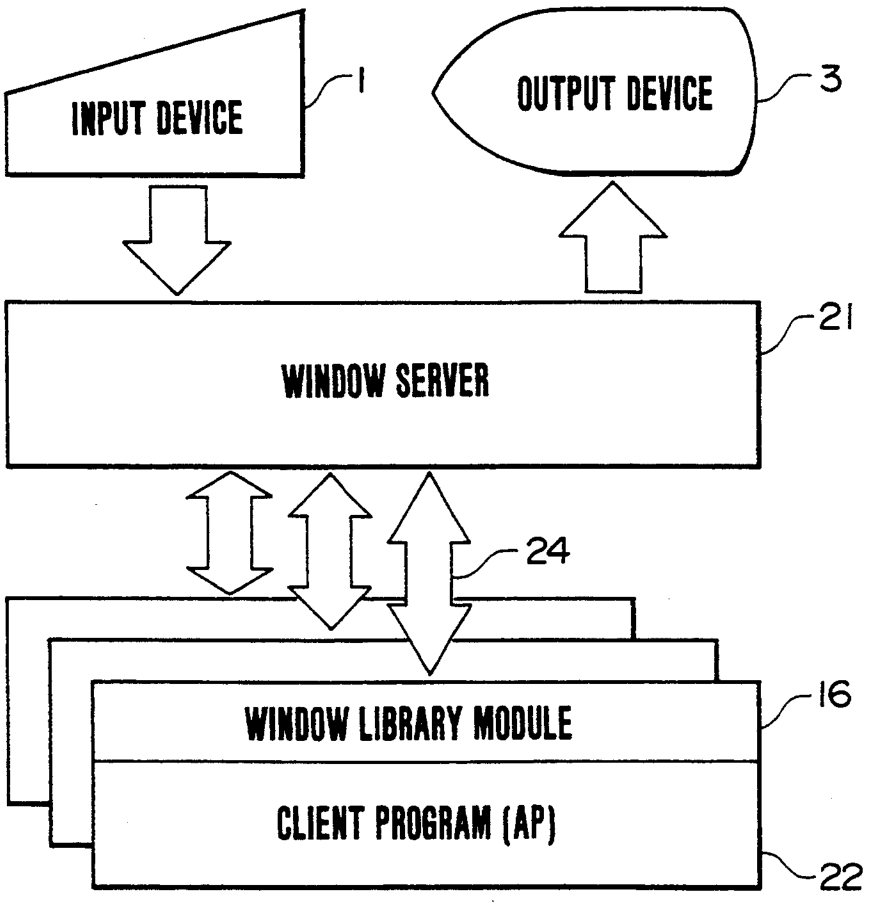
FIG. 4 is a conceptual diagram useful to explain the basic operation of a window system of server/client model employed in accordance with the present invention.

The memory 7 is loaded with, as shown in FIG. 3, an operating system 20, a window server 21, client programs (application programs AP-1 to AP-n) 22, a control program 23, etc. The CPU 6 accomplishes processings of input data and input commands in accordance with these programs. In this regard, FL denotes a flag area provided for each client program and is set to "1" or "0" when the client program is operating in the electronic conversation (collaborate information processing) mode or the local mode, respectively.

In accordance with the embodiment of the present invention, each of the workstations is, as shown in FIG.

4, equipped with an X window system (a trade mark of the Massachusetts Institute of Technology) which is a window system of server/client model. The X window system includes the window server program 21 operating to process inputs and outputs of the workstation. Each client program 22 is executed to carry out a communication with the window server 21 via a logical inter-program communication channel 24 called a display connection. The communication is accomplished by the window library module 16 supported by the window system. Consequently, each client program compiled is required to be linked with the window library module 16.

The window server 21 delivers an input from the input device 1 in the format of an event to the client program 22. Moreover, on receiving an output request called a request from the client program 22, the window server 21 outputs the request to the physical output device 3.

Each window library module 16 includes a group of many modules, such as a module to establish display connection (M-1), a module to get events (M-2), a module to send output requests (M-n), etc. When necessary, the client module 22 calls several modules selected from these modules depending on requirements of the objective processing.

Figure 5:
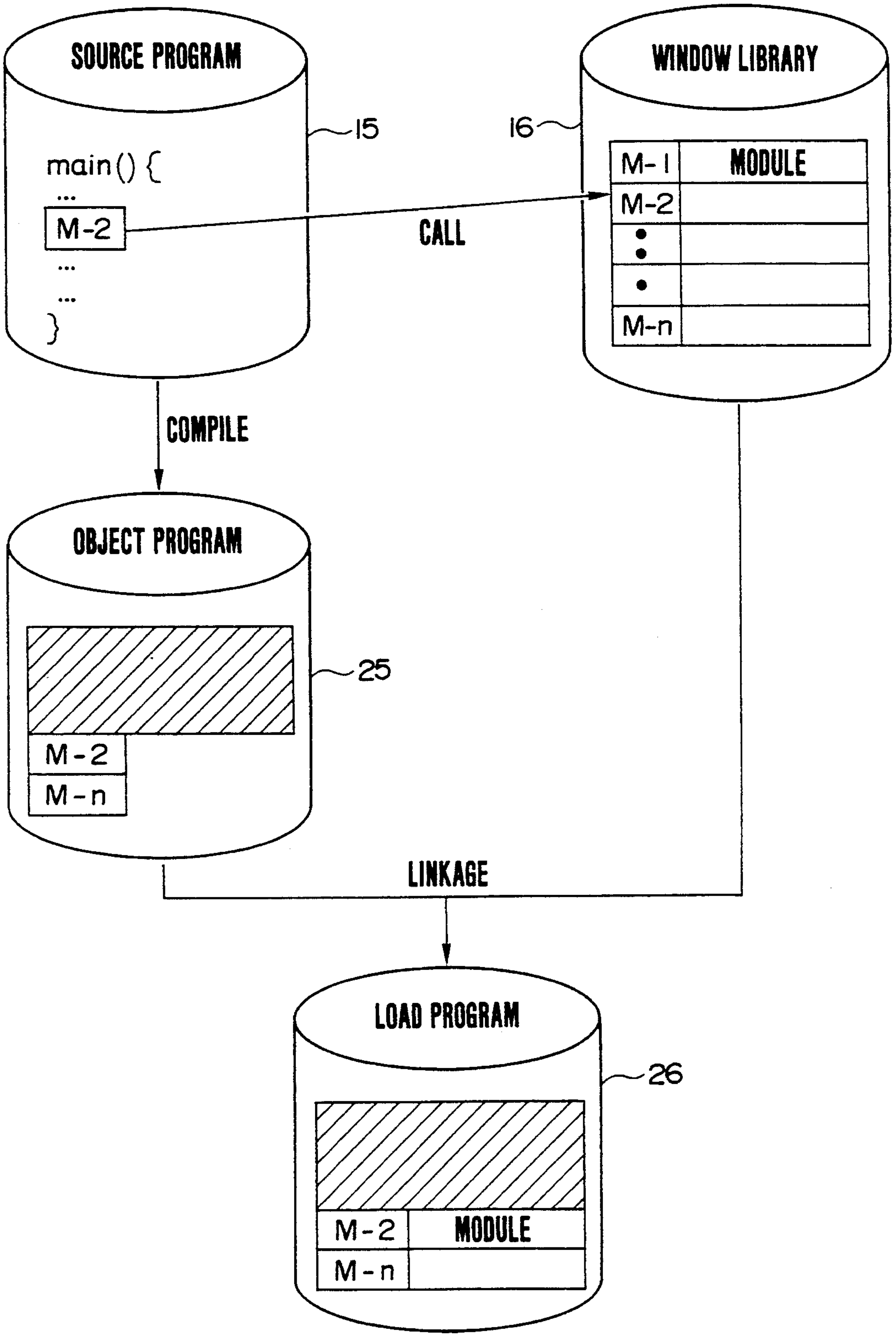
FIG. 5 is a schematic diagram for explaining a method of using the window library according to the present invention.

When a client program (source program) 15 is complied, there is created an object program 25 as shown in FIG. 5.

The object program 25, however, cannot be directly executed for the following reason. Namely, although the object program 25 includes information of window library modules to be called by this program, the window library is separately disposed with respect to the object program 25 and hence does not include information related to the object program 25 in this stage.

A linkage editor program(linker) is executed to link the object program 25 with the window library 16. The linker references the contents of the object program 25 to examine names (M-2 and M-n in the example of FIG. 5) of modules called by the object program 25 so as to select the pertinent modules from the window library 16 and then links the object program 25 with the associated modules, thereby producing an executable load program 26.

In accordance with the embodiment of the present invention, the window library module 16 is modified to enhance or expand the functions thereof so that processing necessary for the collaborative information processing is executed in addition to the processing conventionally used. In this case, when the module names and the calling procedures are completely identical before and after the function enhancement or expansion, the collaborative information processing function can be installed in the respective workstations merely by re-executing the linkage processing without modifying the source programs of the client programs.

Figure 6:
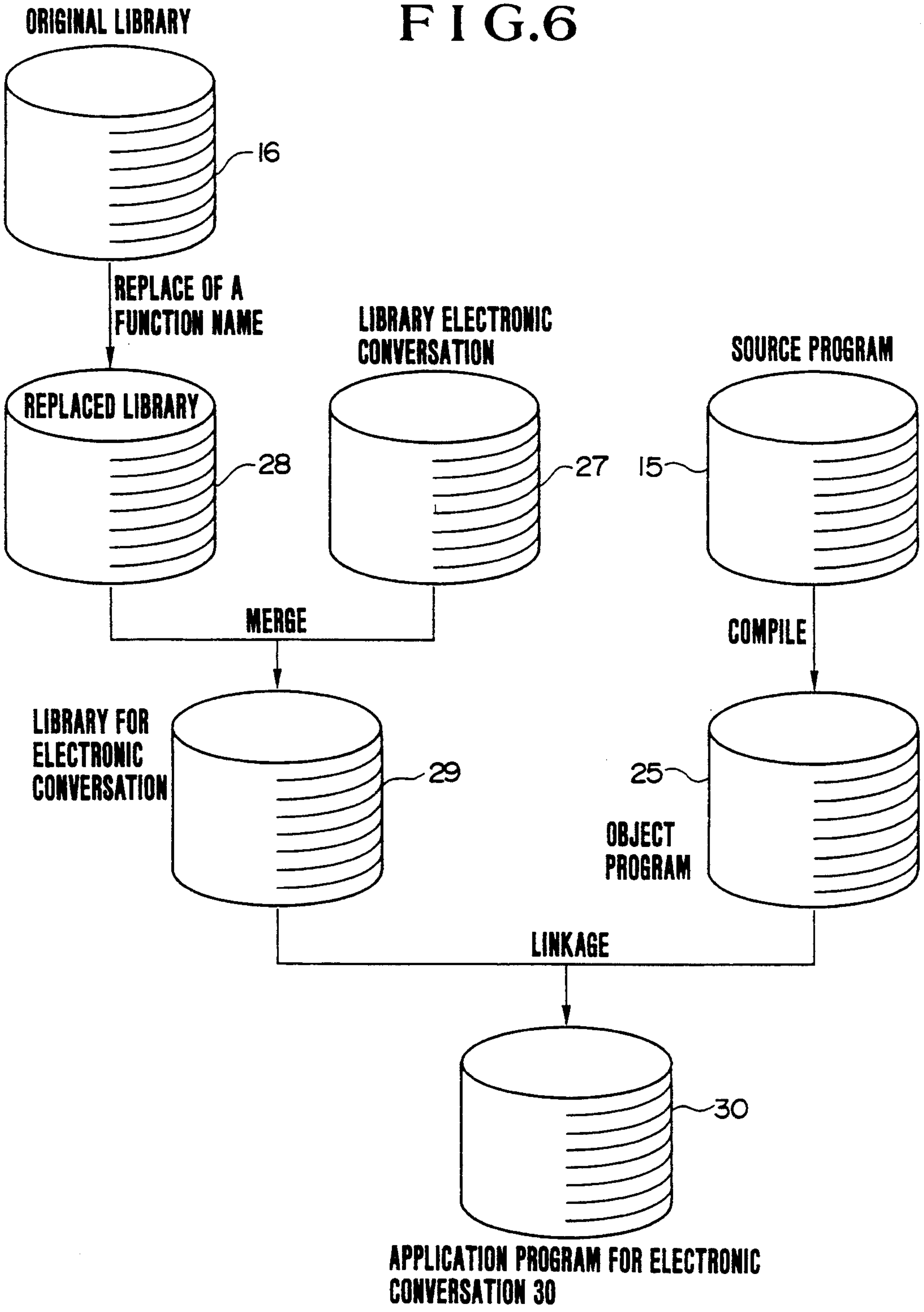
FIGS. 6 and 7 are diagrams useful to explain a method of modifying the window library according to the present invention.
Figure 7:
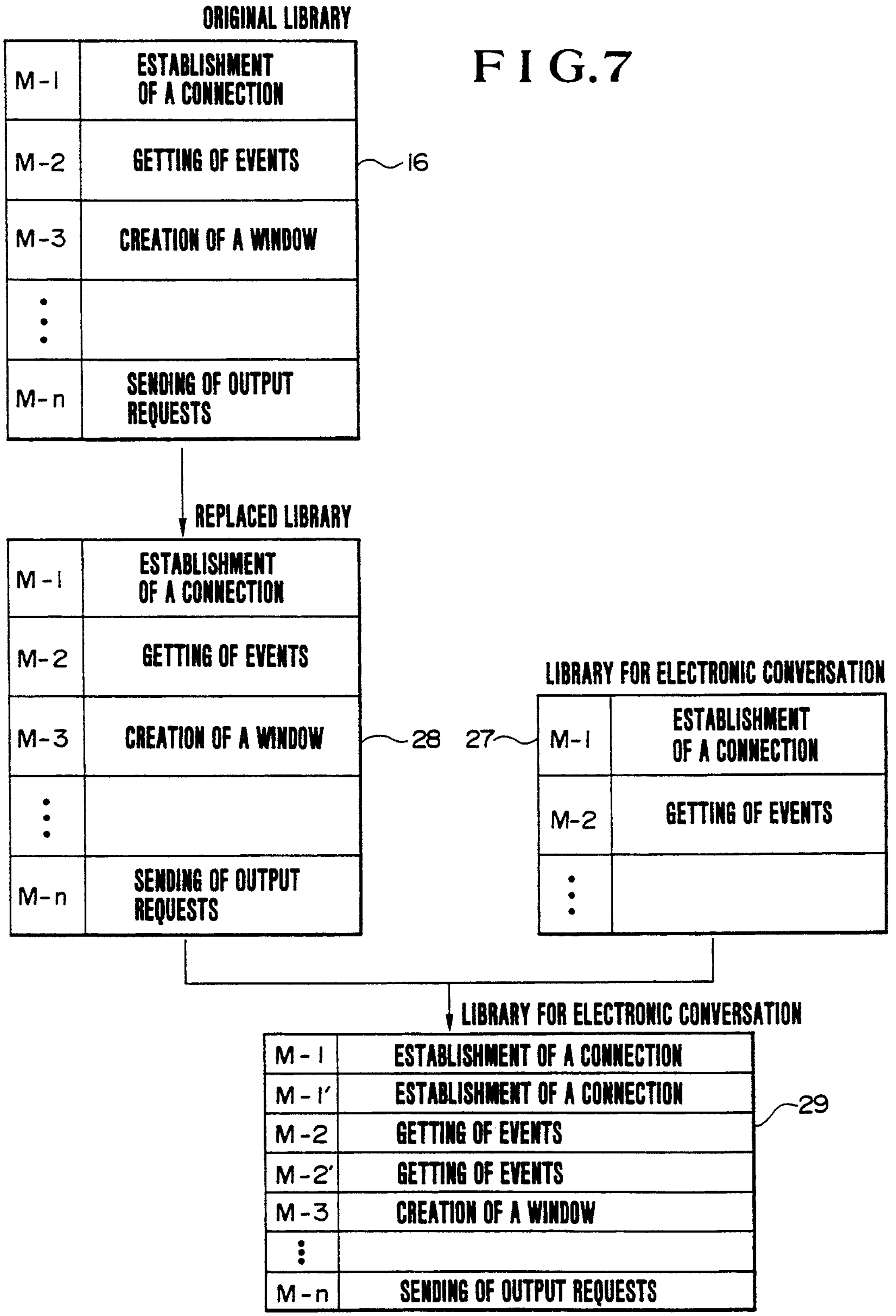

FIGS. 6 and 7 are diagrams for explaining a method of modifying the conventional window library to achieve the collaborative information processing in the X window system according to the present invention.

When the cooperative information (electronic conversation) function is added to a workstation, some window library modules 16 originally loaded in the workstation for the cooperative information (electronic conversation}are required to be modified. For each of the modules necessitating a modification, a function of the collaborative information processing is added thereto to prepare a new module 27 having an enhanced function. The module name and the calling procedure are identical in the module 27 and the original module 16. For the remaining modules not to be modified, such new modules 27 need not be generated.

Subsequently, for the original modules 16 necessitating the modification, namely, for which the new modules 27 are created, a function name change (replacement) is conducted to produce a replaced library 28.

In the embodiment of FIG. 7, the original module names respectively corresponding to the new modules M-1 and M-2 are changed to M-1' and M-2', respectively.

Since the new module 27 is obtained by expanding the function of the original window library module 16, the original modules associated therewith may be removed from the replaced library. However, the names of these modules are changed so as to retain the original modules in this embodiment such that the new modules prepared for the electronic conversation uses these original modules as subroutines.

Merging the replaced module 28 with the new module 27, there is obtained a window library module 29 for the electronic conversation, which is to be adopted in place of the original library module 16. When viewed from a client program existing outside the electronic conversation library 29, the library 29 thus created is virtually the same as the original window library 16.

However, when the object program 25 attained by compiling the source client program 15 is subjected to the linkage processing, the object program 25 is linked with the electronic conversation library module 29 in place of the original library module 16. Consequently, the generated load program 30 is executable in the collaborative information processing (electronic conversation). That is, without modifying the original source client program 15, there is obtained a client program for the electronic conversation.

Next, for easy understanding of the present invention, the window library module 16 will be described in detail by reference to FIGS. 8 and 9.

Figure 8:
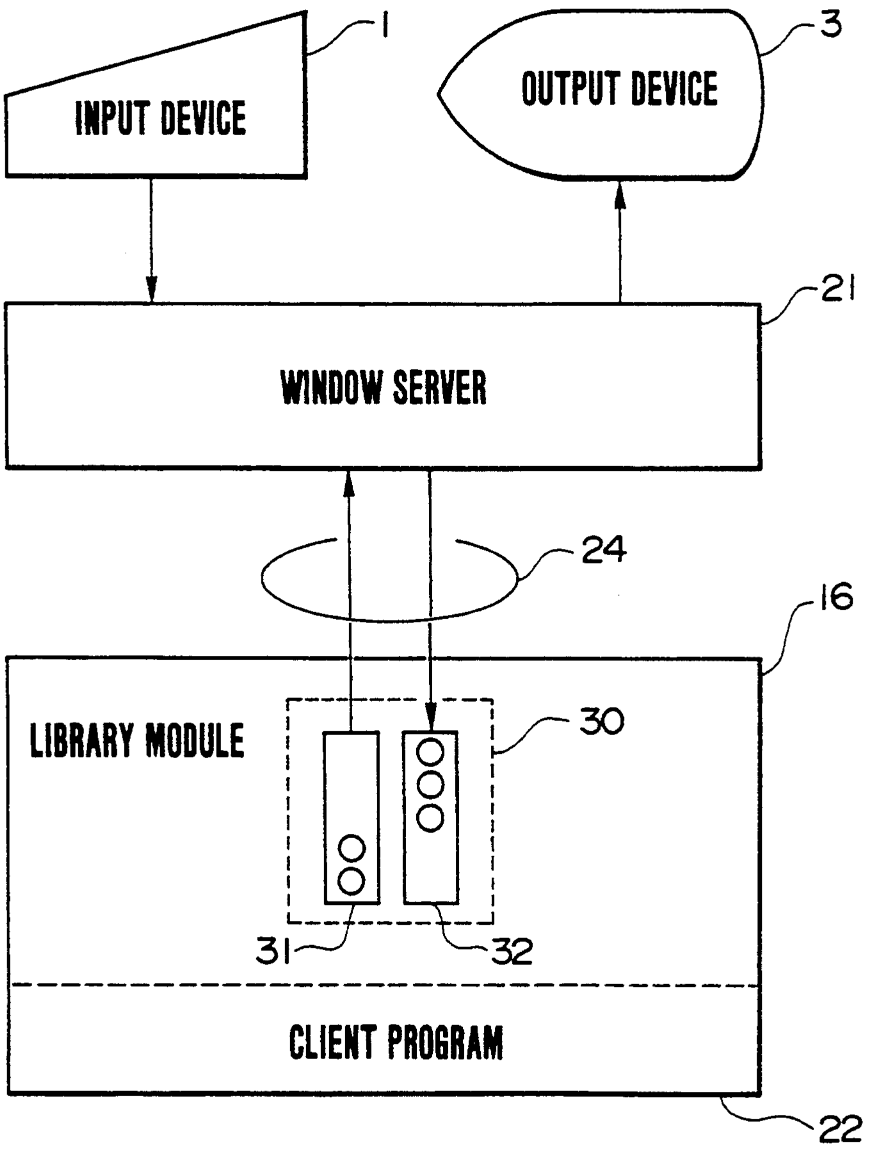
FIG.8 (PRIOR ART)
FIG. 8 is a diagram for explaining functions of the conventional window library module.

As shown in FIG. 8, the window library module 16 includes a buffer area 30 for communications with the window server 21. In the buffer area 30, there are allocated an output buffer 31 for temporarily storing therein a request issued from the client program 22 and an event queue area 32 for temporarily storing therein an event received from the window server 21. The respective client programs 22 are executed to communicate with the window server 21 through the buffer area 30.

Figure 9:
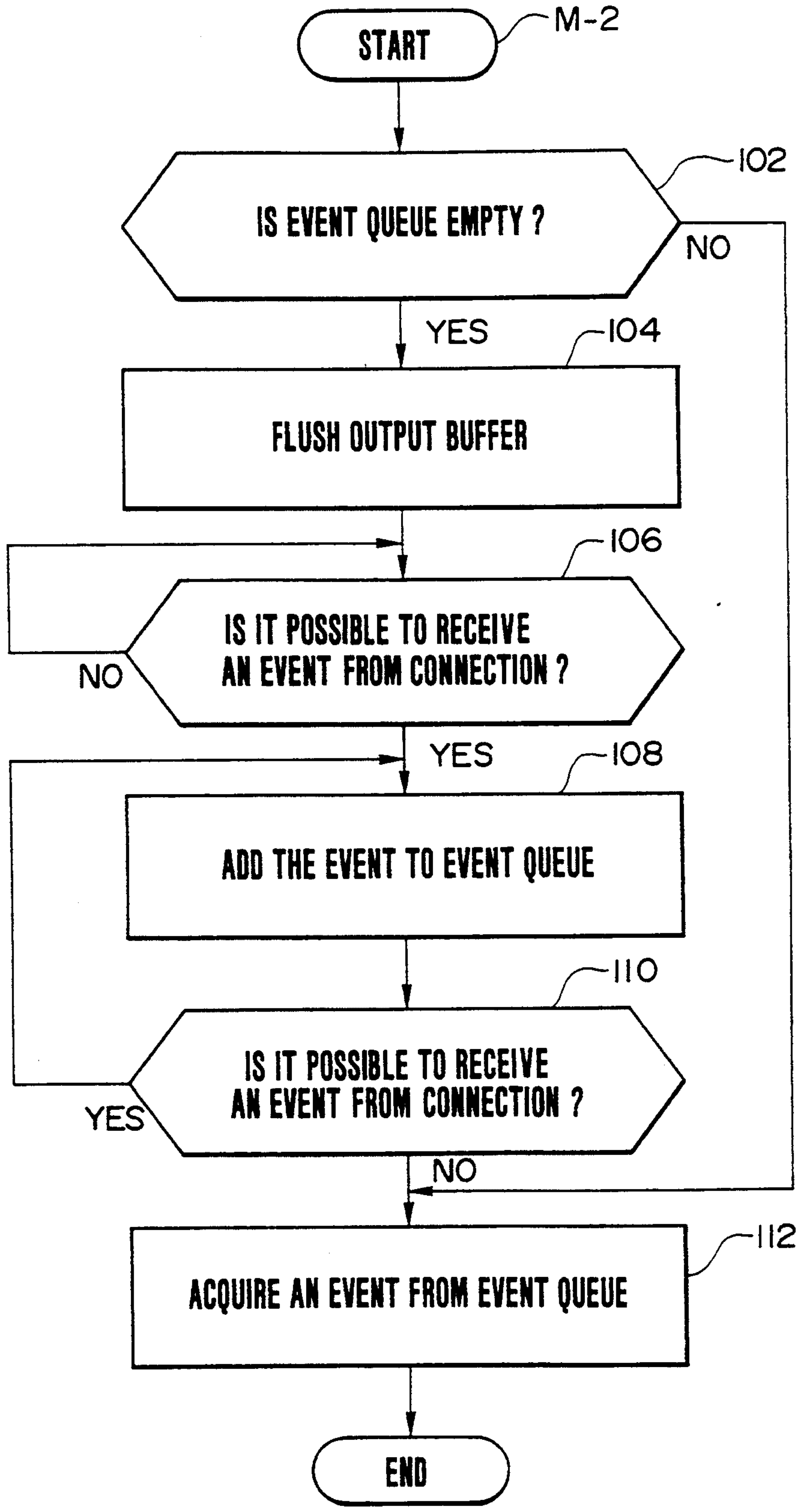
FIG.9 (PRIOR ART)
FIG. 9 is a flowchart showing the operation of the conventional module to get events.

FIG. 9 is a flowchart showing the function of an original module to get events M-2' as an example of the window library module 16.

To communicate with the window server 21, the client program 22 periodically calls the module to get events M-2'. The module M-2' thus called first checks to determine whether or not the event queue 32 contains any events (step 102). If this is the case, the module M-2' gets an event therefrom to transfer the acquired event to the calling client program 22 (step 112).

If the event queue 32 is empty, the module M-2' first acquires requests from the output buffer 31 to send the requests to the window server 21. This operation is called a flushing of an output buffer (step 104). Subsequently, an attempt is made to read an event from the connection 24 related to the window server 21. If there does not exist any event to be read, a wait state is established to await the next event (step 106). If an event to be read is present, the event is obtained and is queued in the event queue 32 in a sequential manner (steps 108 to 111). Thereafter, an event is acquired from the event queue 32 to deliver the event to the calling client program 22 (step 112).

Figure 10:
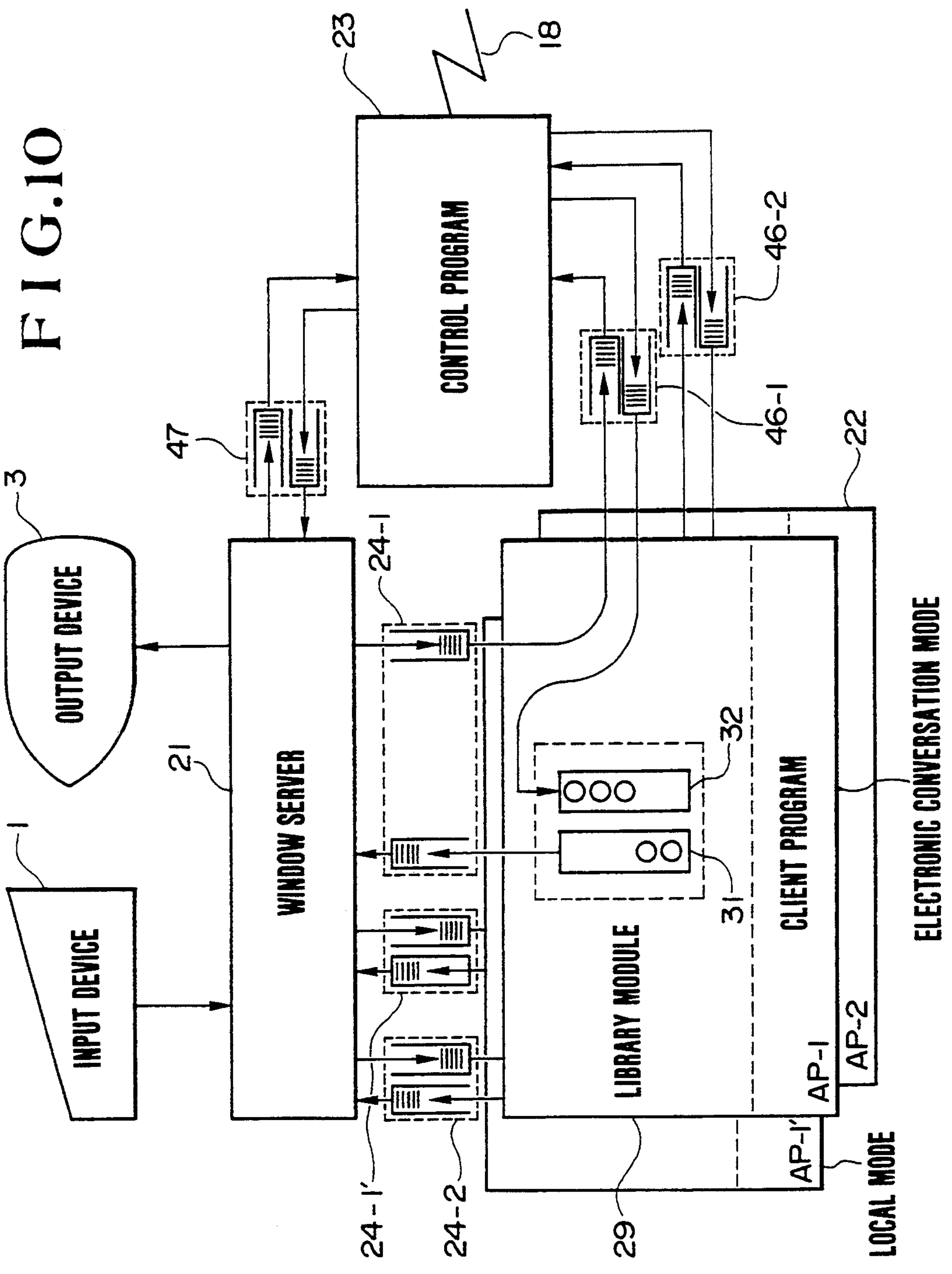
FIG. 10 is a schematic diagram useful to explain functions of the window library for use in the electronic conversation according to the present invention.

FIG. 10 shows relationships between the new window library module 29 having the electronic conversation function, the window server 21, and the control program 23. In the example, two client programs AP-1and AP-2and a client program AP-1′ are operating under the window server 21 in the electronic conversation mode and the local mode, respectively.

Even when linked with the new window library module 29, the client program AP-1′ in the local mode achieves the operation shown in FIG. 8 because a link 24-1′ is established to the window server 21 in the same way as for the original module.

On the other hand, for the two client programs AP-1and AP-2in the electronic conversation mode, there are established, in addition to the connections 24-1 and 24-2 to the window server 21, communication channels 46 (46-1 and 46-2) to the control program 23. In this specification, the communication channels 46 are particularly called ports. Like the connection 24, each port 46 is available for full-duplex communication, namely, a data transfer from the client program side to the control program side and a data transfer in the reverse direction can be independently accomplished therethrough.

When called by the client program AP-1′ operating in the local mode, the new module to get events M-2 for the electronic conversation in accordance with the embodiment of the present invention achieves an interaction with the window server 21. On the other hand, when called by the client program AP-1 or AP-2operating in the electronic conversation mode, the module M-2 conducts an interaction with the control program 23 in addition to the interaction with the window server 21.

On receiving an event from the window server 21, the module to get events for electronic conversation M-2 is executed to transfer an event via the port 46 to the control program 23 and deliver an event received from the control program 23 to the client programs AP-1 and AP-2 if the client programs are in the electronic conversation mode in which the client programs operate in cooperation with the control program 23. If the client programs are operating in the local mode, the event received from the window server 21 is directly delivered to the client programs AP-1 and AP-2.

The control program 23 runs to transmit the events received via the port 46 to another workstation through the communication channel 18 and output the events received from other stations via the communication line 18 to the port 46 in an order in which the events are received. Consequently, the module to get events M-2 receives both of the event (input operation data or commands) inputted from the input device 1 thereof and events generated in other stations so as to pass these events to the client programs AP-1 and AP-2. The client programs run to execute data processing associated with these events to supply results of the processing (requests) via the output buffer 31 to the window server 21 such that the requests are reflected onto the output device 3. Resultantly, the participants or attendees (stations) can conduct the electronic conversation while referencing the identical output results on the displays respectively associated therewith.

In this regard, between the control program 23 and the window server 21, a display connection 47 similar to the connection 24 is formed for the control program 23. For example, when the operator achieves a move operation of a pointing object or a drawing object displayed on the display screen for the conversation, these events are fed from the window server 21 via the connection 47 to the control program 23 and then results of the processing achieved by the control program 23 are delivered via the connection 47 to the window server 21.

Figure 11:
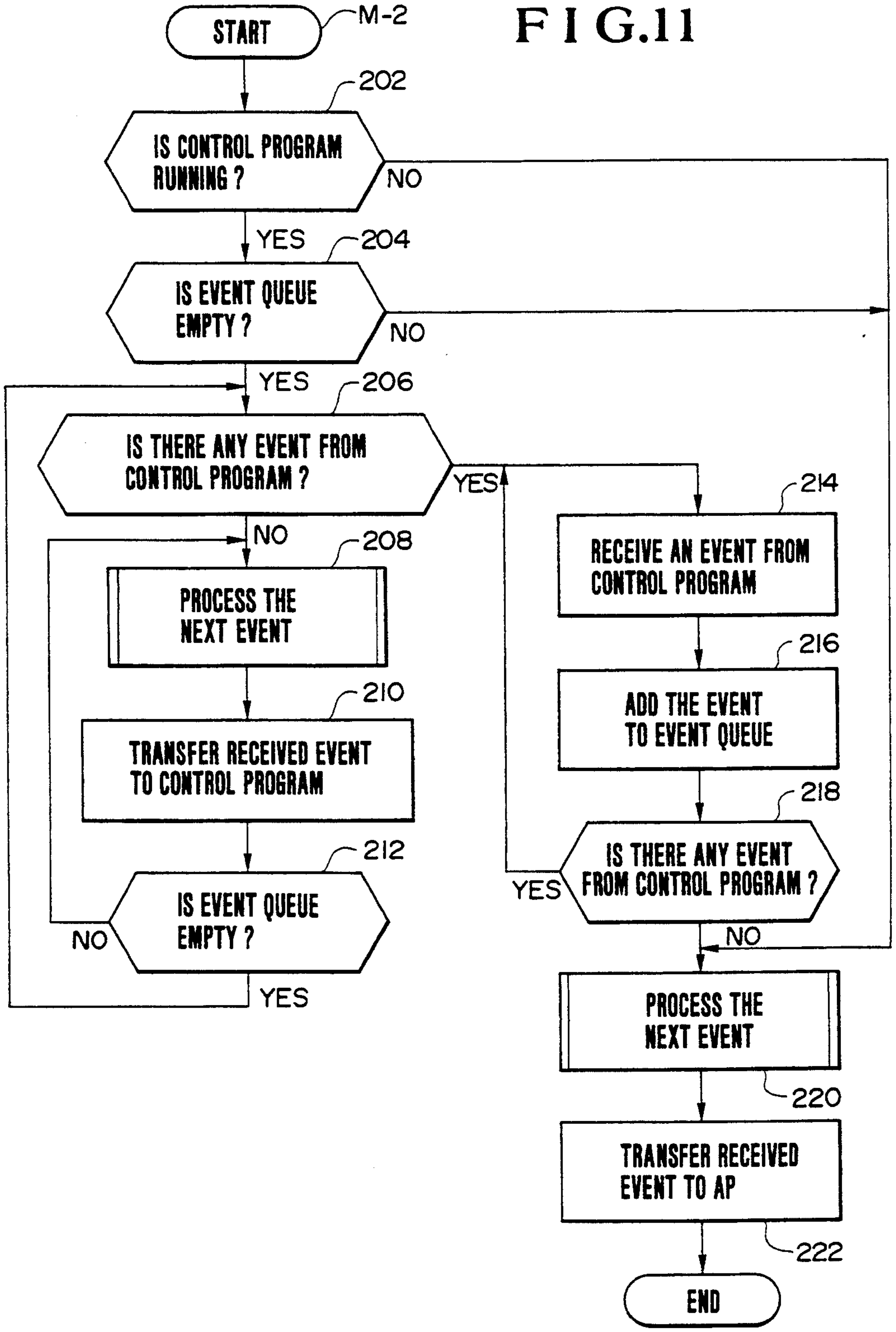
FIG. 11 is a flowchart showing the operation of the module to get events according to the present invention.

FIG. 11 shows a processing flowchart of the module to get events for electronic conversation M-2.

When called by a client program, the module M-2 first checks to determine whether or not the calling client program is running in the electronic conversation mode i.e. in cooperation with the control program 23 (step 202). If the control program 23 is not in the cooperative operation, namely, if the client module is operating in the local mode, the step 202 proceeds to execute a subroutine call to initiate the original module M-2′ and the pass an event received from the module M-2′ (an event acquired from the event queue 32) to the client program, thereby returning control to the calling client program (step 222).

If the control program 23 is in execution, the module M-2 checks to determine whether or not the event queue 32 contains any events (step 204). If there exists events therein, control is passed to a step 220 so as to execute the original module M-2′, thereby passing an event acquired from the event queue 32 to the client program (step 222).

When the event queue 32 is empty, the port 46 is checked to determine whether or not there exist any events received from the control program 23 (step 206). If such an event is missing in the port 46, a step 208 is initiated to execute the original module M-2′. As can be clearly appreciated from the flowchart of FIG. 9, since the event queue 32 is empty in this case, the original module M-2′ executes the steps 104 to 110 to transfer the events loaded in the connection 24 of the window server 21 to the event queue 32. Thereafter, one of the events is acquired from the queue and then is delivered to the module M-2 .

In the module M-2, to send the event received from the module M-2′ to the control program 23, the event is outputted to the port 46 (step 210). If the event queue 32 still contains events (step 212), control is returned to the step 208 so as to execute the module M-2′, thereby passing an event obtained from the event queue to the port 46. Through the repetitious operations of the steps 208 to 212, all events which have been loaded by the module M-2′ into the event queue 32 are transferred to the port 46. These events are then sequentially obtained therefrom by the control program 23 to be inputted to the port 46 in the format combined with events from other workstations.

In the step 212 of the module M-2, when it is confirmed that the event queue 32 is empty, control is passed again to the step 206. If the port 46 is loaded with events from the control program 23, control branches to the step 214; otherwise, the processing of the steps 208 to 212 is repeatedly executed.

If the port 46 has received any event from the control program 23, an event is acquired therefrom (step 214) and is then enqueued in the event queue 32 (step 216). This operation is repetitiously accomplished until the port 46 becomes empty (step 218). When the events are entirely transferred from the port 46 to the event queue 32, a step 220 calls the original module M-2′ such that an event is received from the original module M-2′ to be passed to the client program (step 222).

As can be understood from the above description when a client program in the electronic conversation mode calls the module to get events M-2, an event acquired via the control program 23 is delivered to the client program. On the other hand, when a client program in the local mode calls the module to get events M-2, an event obtained from the window server 21 is directly fed to the client program. In this situation, when calling the new module for electronic conversation M-2, there is used a name (function name) of the module M-2 which is identical to that of the module M-2 contained in the original library 16. Consequently, the existing client programs can be applied to the electronic conversation environment without any modification thereof.

In the case where a conversation is conducted between a plurality of attendees or participants at the respective stations while visually checking an identical display screen image, it is favorable that each attendee can point to a desired item on the display screen by moving a pointing object. The pointing object is represented by a pattern having a shape and a color uniquely assigned to each participant.

In order for an attendee or a participant of the conversation to use a pointing object, the participant achieves a predetermined input operation (a pointing object usage start operation) in an application window while a client program is in execution. The usage start operation is not fixed, namely, the operation may be appropriately changed for convenience of the user. When the start operation is completed, the system enters the pointing object operation mode.

Next, a description will be made of the pointing object operation in which a mouse is used as the pointing device.

When an input operation which is not ordinarily used by the client programs is achieved as the pointing object usage start operation, for example, when a control key and a particular character key are simultaneously depressed on the keyboard, a pointing object is presented at a position of the client window indicated by the mouse pointer. The system resultantly enters the pointing object operation mode. In this mode, an event is not delivered to any client program, namely, the event is interpreted by the control program 23 as an operation for the pointing object.

The mode adopted prior to the pointing object operation mode is called a client program usage mode. In addition to shapes of the pointing objects preliminarily prepared in the system, the user may arbitrarily define a shape for a pointing object to express his or her own pointing object on the screen.

When the user operates the mouse to move the mouse pointer to a position and then depresses a mouse button, the pointing object is moved to the position of the mouse pointer. Moreover, when the user moves the mouse while depressing the mouse button, the pointing object is moved along a track of the mouse pointer.

The pointing object is displayed independently of the operations of client programs. While the pointing object is being displayed, a screen outputted from a client program is presented in the client window. In addition, a portion covered with the pointing object in the client window is restored to the state of the client program display when the pointing object is moved to another location.

The user may employ a drawing object in place of a pointing object. A drawing object is provided to display a handwritten line in the client window. The drawing object is operated in almost the same fashion as for the pointing object. However, when the drawing object is moved, a track of the movement thereof is drawn on the screen.

Before using a drawing object, the user conducts a drawing object usage start operation in the pointing object operation mode. In the start operation, like in the pointing object usage start operation, it is possible to allocate an operation specified by the user. When the drawing object usage start operation is accomplished, a drawing object is presented at a position previously occupied by the pointing object. The system then enters the drawing object operation mode.

In the case where the drawing object is displayed at a location in the client window, when the operator moves the mouse pointer and then depresses the mouse button, the drawing object is moved to the position where the mouse button is depressed. Moreover, a straight line is drawn from the original position of the drawing object to the position where the mouse button is depressed. In addition, when the operator moves the mouse pointer with the mouse button kept depressed, the drawing object is moved along a track of the mouse pointer and a line is drawn along the track of the drawing object at the same time.

Figure 12:
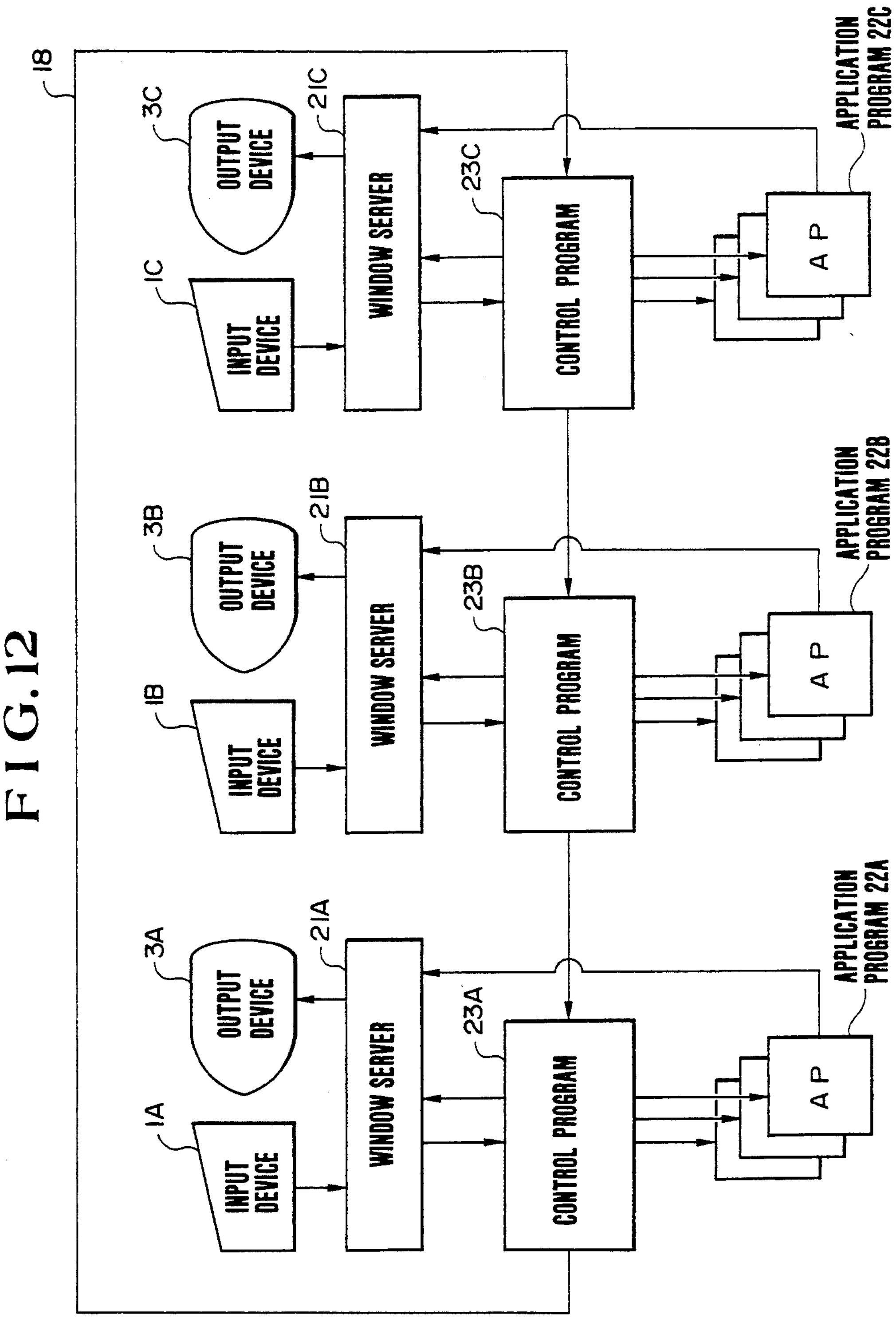
FIG. 12 is a diagram useful to explain the operation of an electronic conversation system including three workstations.

FIG. 12 shows a collaborative information processing system (conferencing system) including three workstations A, B, and C each using the electronic conversation module. A plurality of client programs are operating under each participant of the conference. Some programs are cooperatively operating via control programs 23A to 23C, whereas some programs are operating in the local mode i.e. in an independent fashion. Such programs not conducting cooperative operations achieve completely the same operation as that executed in the conventional system.

For the client programs cooperating with each other, an input event from each participant is distributed to the three control programs 23A to 23C and then is transferred therefrom to the client programs in the cooperative operation related to the associated participants. In consequence, these client programs can be simultaneously operated by the three participants. A description will now be made of the operations of the client programs cooperatively used as above.

In the electronic conversation system, the client program 22 calls the module to acquire events for electronic conversation 29 to receive an event from the control program 23 via the port 46 so as to process the received event in almost the same manner as that used in the conventional processing.

Consider the case where an attendant or participant A supplies an input from the input device 1A of the workstation. In response thereto, the window server 21A generates an input event corresponding to the input. The event is then delivered to the control program 23A associated with the participant A. In FIG. 12, the event seems to be directly passed from the server 21A to the control program 23A. However, in an actual operation, as described above, the module to get events 29 called by a client program 22A receives an event from the server 21A to deliver the received event via a port to the control program 23A.

Next, on receiving the input event, the control program 23A of the participant A runs to check for the current input mode. The input mode includes a pointing object mode in which the pointing object is available and a client mode in which an ordinary client operation can be accomplished.

If the client program 22A is in the client mode, the control program 23A is executed to transfer the received event to the client program 22A of the attendee A and delivers the event via a conversation communication channel 18 to the control programs 23B and 23C of the other participants.

If the client program 22A is in the pointing object mode, the control program 23A runs to carry out processing to display a pointing object and then passes the event via the conversation communication channel 18 to the other participants. The event is not sent to the client program 22A in such a situation.

On receiving the event from the attendant A, each of the control programs 23B and 23C respectively of the participants B and C serves to check the input mode. If the client programs 22B and 22C are in the client mode, the event is passed thereto. As a result, the input supplied from the participant A is delivered to the client programs respectively associated with the three participants.

Thanks to the shared usage of the event among the client programs, a plurality of users at remote locations can execute an identical program, thereby providing a new realtime collaborative information processing function.

Conventionally, in the case where a document generated, for example, by a user A is delivered to a user B via facsimile communication and then the contents of the document are discussed between the users over the telephone such that the user B modifies the document, the resultant document is required to be delivered again to the user A. In contrast thereto, with the provision of the joint or shared usage of the client programs, the respective users can visually check the same materials displayed by an identical program. Consequently, when one of the users changes the contents of the document, the modification is immediately reflected onto the materials presented to the other users.

As a result, the present invention is applicable, for example, to a conference in which participants conduct an electronic conversation by referencing and updating the same materials and to a software development in which several development groups generate and modify programs while referencing the shared file associated with the programs. Moreover, when one of the users participating in a conference carries out an operation for an application program (AP), the same processing result is also obtained by the other users. In consequence, the present invention is applicable to the case where an operator experienced in the operation of the application programs conducts a presentation of necessary operations to those unskilled in the operation.

As can be clearly appreciated from the description set forth above, in accordance with the present invention, conventional application programs can be used for electronic conversation without any modification thereof. Furthermore, since the library employed in accordance with the present invention has an interface identical to that of the standard library of the window system, various types of application programs can be developed without taking the use of the programs in the collaborative information processing into consideration.

While particular embodiments of the invention have been shown and described, it will be obvious to those ordinarily skilled in the art that various changes and modifications may be made without departing from the present invention in its broader scope.

What is claimed is:

1. A workstation for performing a collaborative information processing in cooperation with at least one remote workstation connected thereto via a communication network, comprising:

input means for inputting data and commands;

display means, having a display screen, for presenting thereon a plurality of windows;

execution means for executing programs and modules;

memory means for storing programs and modules to be executed by said execution means; and communication means for performing communication with said remote workstation via said communication network;

said memory means storing:

(i) a conversation control program for communicating with a conversation control program in said remote workstation via said communication means to perform collaborative information processing with said remote workstation;

(ii) a plurality of client programs each defining an information processing to be executed in accordance with a logical input event supplied thereto and for issuing an output request in accordance with a result of said information processing;

(iii) a plurality of window library modules provided respectively in association with respective ones of said client programs; and (iv) a window server program for converting input data or a command, inputted by said input means to one of said windows, into a logical input event, for distributing the logical input event to one of said plurality of window library modules which is associated with a client program which defines an information processing to be executed in accordance with said logical input event, and for updating a display content of said one window as presented on said display screen in accordance with an output request issued from said client program and received via said one window library module;

wherein at least one of said plural window library modules has a function to supply logical input events received from said window server program to said conversation control program, a function to deliver logical input events received from said conversation control program to the client program associated therewith, and function to transfer output requests issued from said client program to said window server program; and wherein said conversation control program has a function to transmit logical input events received from said window library modules to said conversation control program in said remote workstation via said communication means and to selectively distribute logical input events received from each of said window library modules, as well as logical input events received from said conversation control workstation, to other window library modules.

2. A workstation according to claim 1, wherein:

said plural client programs are operable selectively in a collaborative operation mode for operating in cooperation with said remote workstation and a local operation mode for operating independently of said remote workstation, each of said window library modules is operable, when the client program associated therewith is operating in the local operation mode, to directly communicate logical input events and output requests between said window server program and said client program.

3. A collaborative information processing system including at least two terminals connected via a communication network, each of said terminals comprising:

a display screen for presenting a plurality of windows thereon;

an input device for inputting data and commands for selected windows of the display screen;

processor means for performing information processing; and memory means for storing;

(i) a plurality of application programs to be executed by said processor means, each application program being operatively assigned to a respective one of said windows and having a function to issue an output request in response to a logical input event applied thereto;

(ii) a plurality of window library modules each of which is operatively linked with a respective one of said application programs so as to correlate with one of said windows;

(iii) a window server for converting input data or a command, inputted for one of said windows by said input device, into a logical input event, for selectively distributing said logical input event to one of said window library modules linked to an application program assigned to said one window to which said data or a command is inputted, and for updating said one window depending on the content of an output request received from said one window library module correlated with said one window; and (iv) control program for communicating logical input events with the other terminal via said communication network to therewith;

wherein each of said application programs communicates logical input events and output requests with said window server via the window library module linked therewith; and wherein at least one of said window library modules is provided with first means for passing logical input event received from said window server to said control program, for receiving from said control program not only a logical input event sent by said window server, but also a logical input event transmitted from the other terminal and for delivering logical input events received from said control program to one of said application programs linked therewith, and second means for passing output requests received from an application program to said window server.

4. A collaborative information processing system according to claim 3, wherein;

said control program and said one of said library modules are coupled via a pair of logical communication paths.

5. A collaborative information processing system according to claim 3, wherein;

at least two window library modules are provided with said first means and second means so that said two terminals coordinate visual outputs of at least two of said windows at the respective terminals.

6. A collaborative information processing system according to claim 3, wherein:

each of said application programs is operable in a collaborative operation mode for achieving a cooperation with application programs of other terminal and in a local operation mode for independently achieving operations in its own terminal; and each of said window library modules is operable to directly communicate output requests and logical input events between one of said application programs linked therewith and said window server when the application program is operating in the local operation mode and to communicate logical input events with said control program when the application program is operating in the collaborative operation mode.

* * * * *